United States Patent [19]

Shimizu et al.

[11] Patent Number: 4,916,653

[45] Date of Patent: Apr. 10, 1990

[54] ADDER USING MULTI-STATE LOGIC

[75] Inventors: Toshihiko Shimizu, Tokyo; Masao Hotta, Hanno, both of Japan

[73] Assignee: Hitachi, Ltd., Tokyo, Japan

[21] Appl. No.: 235,528

[22] Filed: Aug. 24, 1988

[30] Foreign Application Priority Data

Aug. 28, 1987 [JP] Japan .................. 62-212746

[51] Int. Cl.[4] .................................. G06F 7/50
[52] U.S. Cl. .................................... 364/784; 364/786
[58] Field of Search .................... 364/784, 786; 307/471–472, 455

[56] References Cited

U.S. PATENT DOCUMENTS

| 4,254,471 | 3/1981 | Hunt | 364/784 |
| 4,471,454 | 9/1984 | Dearden et al. | 364/786 |
| 4,689,763 | 8/1987 | Fang | 364/784 |
| 4,701,877 | 10/1987 | Sahoda et al. | 364/784 |
| 4,718,035 | 1/1988 | Hara et al. | 364/784 |
| 4,733,365 | 3/1988 | Nagamatsu | 364/784 |
| 4,740,907 | 4/1988 | Shimizu et al. | 364/786 |
| 4,831,579 | 5/1989 | Hara et al. | 364/784 |

Primary Examiner—David L. Clark
Assistant Examiner—Tan V. Mai
Attorney, Agent, or Firm—Antonelli, Terry & Wands

[57] ABSTRACT

A binary digital full adder as a component element of a digital circuit receives three binary signals including two input signals and a carry-in from the lower digit. The adder comprises a four-state logic converter for adding together the three binary signals in terms of current addition to convert the sum into a four-state logic signal, and an encoder for deciding a four-state logic level to encode it into a binary sum and a carry-out.

3 Claims, 5 Drawing Sheets

ADDER USING MULTI-STATE LOGIC

BACKGROUND OF THE INVENTION

This invention relates to an adder required for two-step parallel A/D conversion in which the lower bits are converted in overlapping the upper bit overlaps the lower bit in order to make more precise.

An adder used in this field of application has a circuit construction as described in, for example, Semiconductor Data Book, ECL by Hitachi Ltd., pp. 102–104, 3/1982 and has already been commercialized.

This known adder comprises, as shown in FIG. 6 of the accompanying drawings, an exclusive OR gate 701, an inverter 702, AND gates 703 to 707 and OR gates 708 and 709. The exclusive OR (NOR) gate 701 is adapted to decide whether the sum of two input signals A and B is "0" or "1", and the AND gates 703 and 704 and OR gate 708 operate to decide the sum of the decision result delivered from the gate 701 and a carry-in Ci from the lower digit. Any two of the three input signals A, B and Ci are applied to the AND gates 705 to 707, respectively, to produce a carry-out Co which assumes "1" when the two input signals are all "1".

Disadvantageously, the above prior art requires the delay time corresponding to three stages of logic gates and the gate delay time puts restrictions on the operation time of the adder. Further, the sum, designated by S, and the carry-out Co are decided and delivered independently of each other, whereby the sum S is delivered through three stages of gates and the carry-out Co through two stages of gates. Therefore, the propagation delay time is different for the sum S and carry-out Co and these signals must be brought into timed relationship in order for them to be applied to the succeeding logic gate. Furthermore, the number of component elements is large and the prior art adder is unsuitable for use as a component element of an LSI to be formed on a chip.

SUMMARY OF THE INVENTION

An object of this invention is to provide an adder having minimized operation time.

Another object of this invention is to realize an adder in which the number of component elements is minimized and which is suitable for on-chip formation.

According to the invention, an adder comprises a four-state logic converter based on current addition, and an encoder having a circuit for deciding levels of four-state logic.

The four-state logic converter adds together three input signals (two bindary digital input signals and a carry-in from the lower digit) in terms of current addition to convert them into a logic level of 0 (zero) when the three input signals are all "0", a logic level of 1 (one) when any one of the three input signals is "1", a logic level of "2" when any two of the three input signals are "1", and a logic level of "3" when the three input signals are all "1". Essentially, this converter can be constituted by one stage of gates including three fundamental gates connected in parallel with each other which are responsive to the three input signals, respectively. The logic level decider/encoder compares signals of the four-state logic levels with respective intermediate levels between adjacent four-state logic levels and encodes a comparison output signal into a binary sum and a carry-out. Like the four-state logic converter, this logic level decider/encoder can essentially be constituted by one stage of gates including three fundamental gates connected in parallel with each other which are responsive to three intermediate levels, respectively. Thus, the adder can be constituted by two stages of gates including 6 fundamental gates to reduce the number of component elements and the operation time.

DESCRIPTION OF THE PREFERRED EMBODIMENTS

Figure 1:
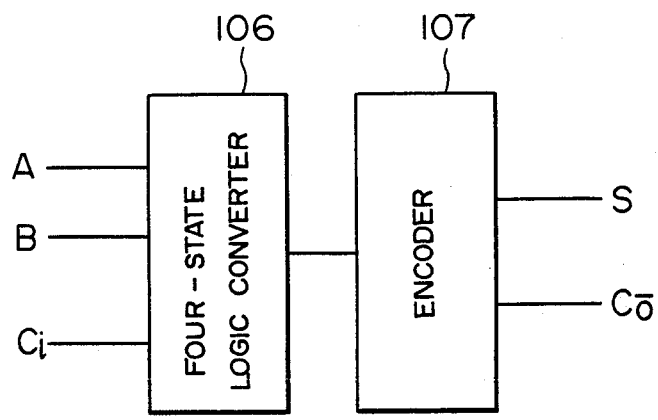
FIG. 1 is a schematic block diagram showing an adder according to a first embodiment of the invention.

Referring now to FIG. 1, there is illustrated, in schematic block form, an adder according to an embodiment of the invention. This adder comprises two stages of a four-state logic converter 106 and an encoder 107 having a four-state logic decision function and is operable to receive binary digital signals A and B as well as a carry-in Ci from the lower digit and deliver a sum S and a carry-out Co.

Figure 2:
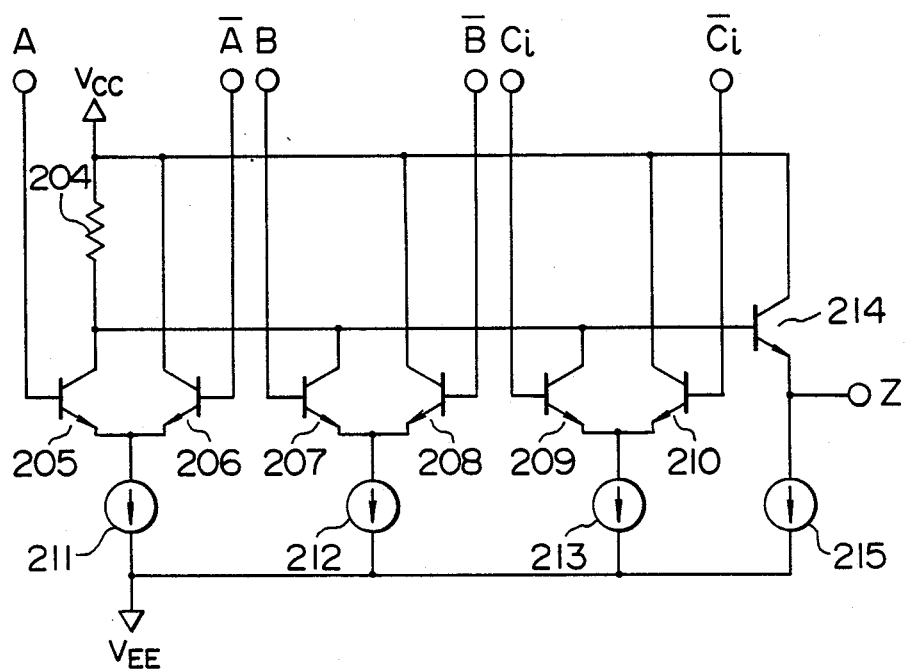
FIG. 2 is a circuit diagram of a four-state logic converter used as a component element of the FIG. 1 adder.

The circuit construction of the four-state logic converter 106 is illustrated in FIG. 2. Transistors 205 and 206 and a constant current source 211 constitute a current switch, and the binary digital signal A is applied to the base of transistor 205 and a signal $\bar{A}$ complementary to signal A is supplied to the base of transistor 206. Similarly, transistors 207 and 208 and a constant current source 212 constitute a current switch and the binary digital signal B is applied to the base of transistor 207 with a signal $\bar{B}$ complementary to signal A supplied to the base of transistor 208. Also, a current switch constituted by transistors 209 and 210 and a constant current source 213 is supplied with the carry-in $C_i$ and a signal $\overline{Ci}$ complementary to signal Ci. The collectors of the transistors 205, 207 and 209 constituting the three current switches, respectively, are connected in common to one end of a resistor 204 and to the base of a transistor 214. The transistor 214 has its collector connected to a positive power supply voltage Vcc and its emitter connected to a constant current source 215 to form an emitter follower. The other end of the resistor 204 and the collectors of the transistors 206, 208 and 210 are connected in common to the positive power supply voltage Vcc. Denoted by $V_{EE}$ is a negative power supply voltage. Where the resistance of resistor 204 is R and the current value of each of the constant current sources 211 to 213 is I, the voltage drop across resistor 204 is 0 (zero) when three input signals A, B and Ci to the current switches are all "0", R·I when any one of the three input signals is "1". 2R·I when any two of the three are "1", and 3R·I when the three are all "1". In this manner, current addition is carried out at the one end of the resistor 204 to convert the binary signals into four-state logic levels "0", "R·I", "2R·I" and "3R·I". These four-state logic levels are related to binary addition results represented by (carry-out Co, sum S) such that "0" corresponds to (0, 0), "R·I" to (0, 1), "2R·I" to (1, 0) and "3R·I" to (1, 1).

Figure 3:
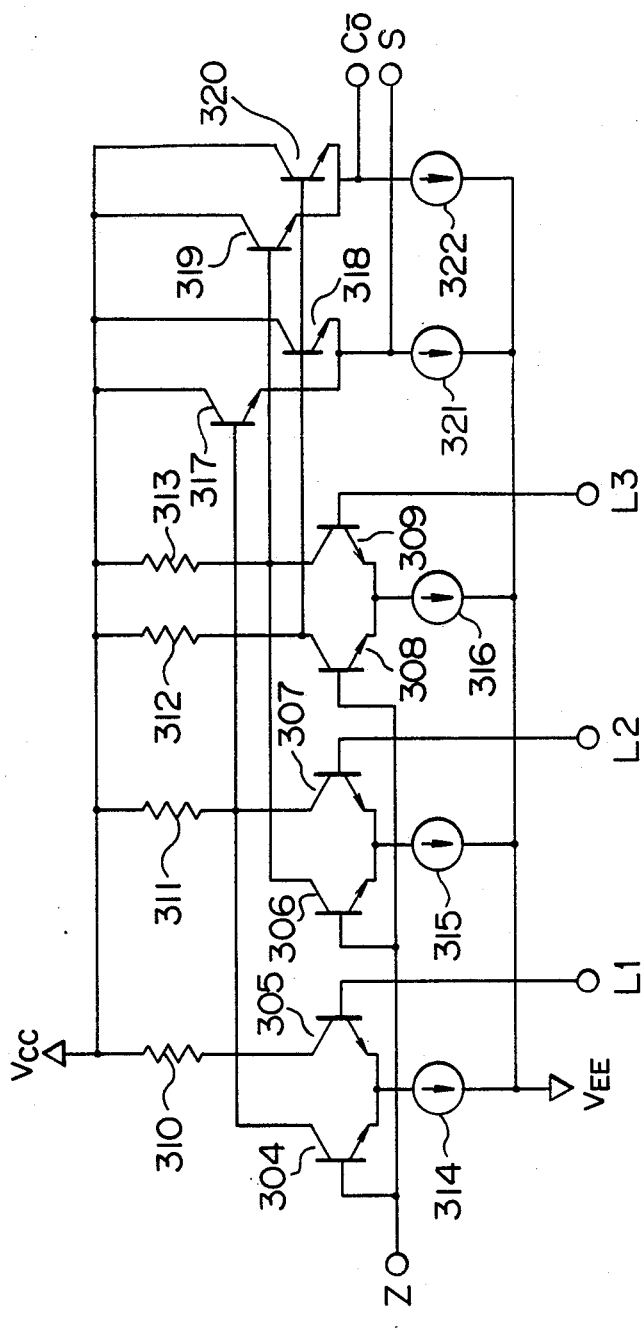
FIG. 3 is a circuit diagram of a four-state logic level decider/bindary encoder used as a component element of the FIG. 1 adder.

The four-state logic levels are decided and encoded to binary output signals (Co, S) by means of the encoder (107 in FIG. 1) having a circuit configuration as shown in FIG. 3. The encoder 107 comprises a differential amplifier pair including transistors 304 and 305 and a constant current source 314, a differential amplifier pair including transistors 306 and 307 and a constant current source 315, and a differential amplifier pair including transistors 308 and 309 and a constant current source 316. The positive power supply voltage Vcc is connected to the collectors of transistors 304 and 307 via a resistor 311, to the collector of transistor 305 via a resistor 310, to the collectors of transistors 306 and 309 via a resistor 313, and to the collector of transistor 308 via a resistor 312. While the bases of the transistors 304, 306 and 308 are supplied with an output signal Z from the four-state logic coverter 106, the bases of the transistors 305, 307 and 309 are respectively supplied with reference signals of respective intermediate levels L1, L2 and L3 between adjacent four-state logic levels. Accordingly, the three differential amplifier pairs are comparators which compare Z with L1, L2 and L3, respectively.

Incidentally, the four-state logic levels "0", "R·I", "2R·I" and "3R·I" are passed through the emitter follower to provide output signals Z which assume levels "$V_{CC}-V_{BE}$", "$V_{CC}-V_{BE}-R\cdot I$", "$V_{CC}-V_{BE}-2R\cdot I$" and "$V_{CC}-V_{BE}-3R\cdot I$", respectively, where $V_{BE}$ is base/emitter voltage of the transistor 214. Therefore, the intermediate levels L1, L2 and L3 are respectively set to "$V_{CC}-V_{BE}-\frac{1}{2}R\cdot I$", "$V_{CC}-V_{BE}-3/2R\cdot I$" and "$V_{CC}-V_{BE}-5/2R\cdot I$".

Transistors 317 and 318 respectively cooperate with a constant current source 321 to form an emitter follower and transistors 319 and 320 respectively cooperate with a constant current source 322 to form an emitter follower. The current value of each of the constant current sources 314 to 316 is I' and the resistance of each of the resistors 310 to 313 is R'. When the output signal Z of the four-state logic converter 106 is higher than the intermediate level L1, the transistors 304, 306 and 308 are turned on to pass the current I' through all of the resistors 311, 312 and 313 and output signals of carry-out Co and sum S both assume $V_{CC}-V_{BE}-R'I'$ which represents a low level "0". When Z is L1>Z>L2, transistors 305, 306 and 308 are turned on to cause the current I' not to pass through the resistor 313 but to pass through the resistors 312 and 313. As a result, the carry-out Co assumes $V_{CC}-V_{BE}-R'I'$ which represents the low level "0" and the sum S assumes $V_{CC}-V_{BE}$ which represents a high level "1". When Z is L2>Z>L3, the transistors 305, 307 and 308 are turned on to cause the current I' not to pass through the resistor 313 but to pass through the resistors 311 and 312. Consequently, the carry-out Co assumes the high level "1" and the sum S assumes the low level "0". Finally, when Z is Z<L3, the transistors 305, 307 and 309 are turned on and the current I' does not flow through the resistor 312 with the result that the bases of the transistors 318 and 320 both assume the high level and both of the output signals Co and S assume the high level "1".

Figure 6:
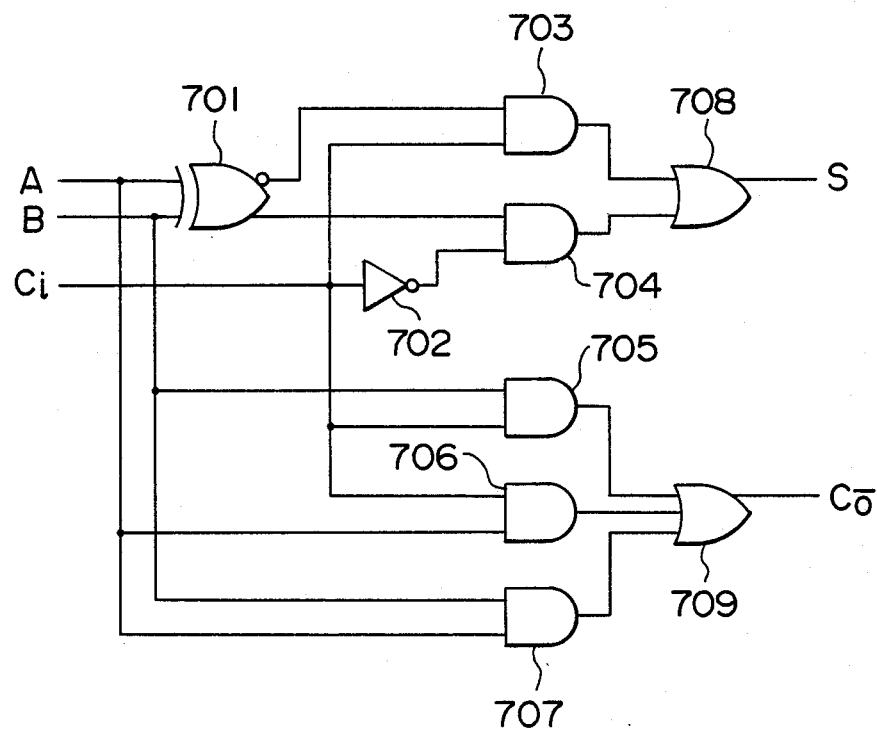
FIG. 6 is a circuit diagram showing a prior art adder.

As described above, the two stages of logic gates suffice to constitute the adder, thus making it possible to reduce the propagation delay time and operation time. The number of component elements of the adder can be halved as compared to the FIG. 6 prior art to permit realization of a compact adder which can contribute to high density of integration when used as a circuit element of an LSI formed on a chip. Further, the sum S and carry-out Co are produced concurrently and they are easy to handle in applying them to the succeeding circuit stage.

Figure 4:
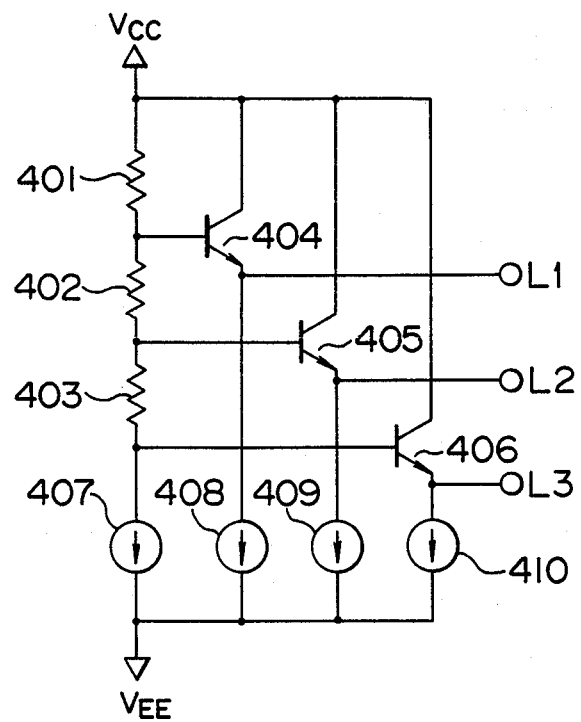
FIG. 4 is a circuit diagram of a generator for generating respective intermediate levels between adjacent four-state logic levels shown in FIG. 3.

The reference signals of intermediate levels L1, L2 and L3 used in the foregoing first embodiment can be generated by a circuit constructed as illustrated in FIG. 4. Resistors 402 and 403 have each the same resistance as that of the resistor 204, a resistor 401 has half the resistance of the resistor 204, and a constant current source 407 has the same current value as that of each of the constant current sources 211 to 213, whereby the intermediate levels for the voltage drops across the resistor 204 can be generated. Transistors 404 to 406 respectively cooperate with constant current sources 408 to 410 to form emitter followers each of which is identical to the emitter follower comprised of the transistor 214 and constant current source 215. The intermediate level generator constituted by components like those of the logic converter ensures the provision of an adder which is immune to temperature variations and power supply variations.

Figure 5:
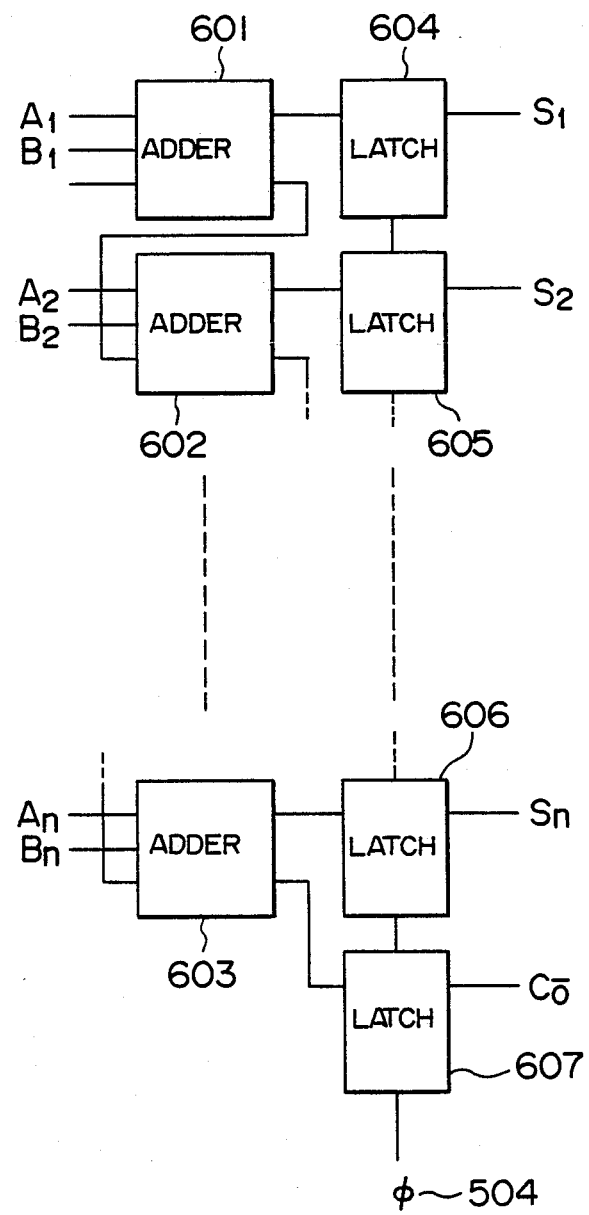
FIG. 5 is schematic diagram illustrating another embodiment of the invention.

Referring to FIG. 5, a second embodiment of the invention will be described. In accordance with this embodiment, an n-bit adder of n adders is constructed by connecting latch circuits 604 to 606 to partial sums S1 to Sn of respective bit adders 601 to 603 and a latch circuit 607 to carry-out Co of the uppermost bit adder 603, whereby the partial sums of the respective bit adders and the carry-out Co of the uppermost bit adder can be latched by a clock signal $\phi$ so as to be delivered synchronously. In this embodiment, propagation delay between partial sums in the n-bit adder can be disregarded apparently and advantageously signal processing in the succeeding system can be simplified.

According to the invention, since the adder can be constructed with two stages of logic gate and the number of component elements can be halved as compared to the prior art by adding together binary digital signals in terms of current addition so as to convert them to four-state logic levels, the propagation delay time can be reduced and the circuit can be simplified and compacted to attain advantages of high speed, high density of integration, realization of on-chip systems and low power consumption. Especially, in an application to two-step parallel A/D converter LSI's wherein addition of more than four bits is required to be performed within an interval of time which is less than half of one cycle for A/D conversion and besides an area which the adder occupies on the chip has to be reduced, the advantages of high speed and compactness or size-reduction are of great significance.

The invention claimed is:

1. An adder for use as a binary digital full adder applied with two binary input signals and a binary carry-in from the lower digit, said adder comprising:

a four-state logic converter for adding together said three binary signals by current addition and converting the sum of said three binary signals into a four-state logic level, said four-state logic converter comprises three current switches respectively applied with said three binary signals as switching signals and a load resistor, output terminals of said current switches are interconnected together to permit current addition by which voltages representative of four-state logic levels are obtained across said load resistor; and an encoder for deciding the level of said four-state logic level and encoding said decided level of said four-state logic level into a binary sum and a carry-out.

2. An adder according to claim 1 wherein each current switch comprises a pair of emitter-coupled transistors and a constant current source connected to the common emitter, constant current sources of said current switches being of a current mirror and providing the same amount of current.

3. An adder according to claim 1 wherein said encoder comprises three comparators of differential configuration each of which has one input applied with a four-state logic output signal of said four-state logic converter and the other input applied with one of respective intermediate levels between adjacent four-state logic levels, and output signals of said comparators are used to encode the four-state logic output signal into the binary sum and the carry-out.

* * * * *